(12) United States Patent
Bursch

(10) Patent No.: US 10,054,086 B2
(45) Date of Patent: Aug. 21, 2018

(54) FILTER BOX ASSEMBLY FOR A BRANCHED INTAKE SYSTEM

(71) Applicant: Toyota Motor Engineering & Manufacturing North America, Inc., Erlanger, KY (US)

(72) Inventor: Eric F. Bursch, Ann Arbor, MI (US)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 173 days.

(21) Appl. No.: 14/998,206

(22) Filed: Dec. 24, 2015

(65) Prior Publication Data

US 2017/0184062 A1    Jun. 29, 2017

(51) Int. Cl.
| | |
|---|---|
| F02M 35/02 | (2006.01) |
| F02M 35/10 | (2006.01) |
| F02B 33/00 | (2006.01) |
| B01D 46/00 | (2006.01) |
| F01N 3/20 | (2006.01) |
| F02M 35/024 | (2006.01) |
| F02M 35/104 | (2006.01) |

(52) U.S. Cl.
CPC ..... *F02M 35/0205* (2013.01); *B01D 46/0047* (2013.01); *F02B 33/00* (2013.01); *F02M 35/021* (2013.01); *F02M 35/0207* (2013.01); *F02M 35/02491* (2013.01); *F02M 35/104* (2013.01); *F02M 35/10157* (2013.01); *B01D 2279/60* (2013.01)

(58) Field of Classification Search
CPC .......................... F02B 33/00; F02M 35/0205;
F02M 35/0207; F02M 35/021; F02M 35/02491; F02M 35/10157; F02M 35/104; B01D 2279/60; B01D 46/0047
USPC ......... 60/294, 297, 311; 55/323, 356, 385.3, 55/478, 482, 489
See application file for complete search history.

(56) References Cited

U.S. PATENT DOCUMENTS

| | | | |
|---|---|---|---|
| 6,267,006 B1 * | 7/2001 | Bugli | G01F 1/6842 73/114.34 |
| 6,287,355 B1 | 9/2001 | Park | |
| 7,857,881 B2 * | 12/2010 | Sato | B01D 46/0002 123/184.32 |
| 2003/0140882 A1 | 7/2003 | Lundgreen et al. | |
| 2007/0193564 A1 * | 8/2007 | Takahashi | F01N 3/2006 123/568.2 |
| 2009/0064677 A1 | 3/2009 | Farmer | |

* cited by examiner

*Primary Examiner* — Patrick Maines
*Assistant Examiner* — Dapinder Singh
(74) *Attorney, Agent, or Firm* — Christopher G. Darrow; Darrow Mustafa PC

(57) ABSTRACT

A filter box assembly for a branched intake system in a vehicle includes an air filter and a filter box housing the air filter. The air filter has a downstream face. The filter box defines an airflow path between a dirty air intake opening and multiple clean air output openings, has a clean air section at the downstream face of the air filter from which each of the clean air output openings open, and includes an interior wall in the clean air section that branches the airflow path to each of the clean air output openings at the downstream face of the air filter.

19 Claims, 5 Drawing Sheets

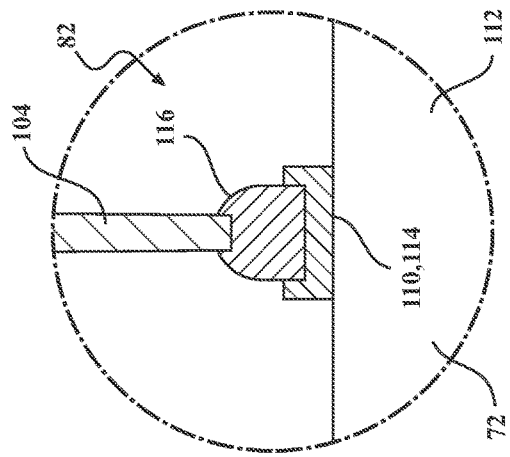
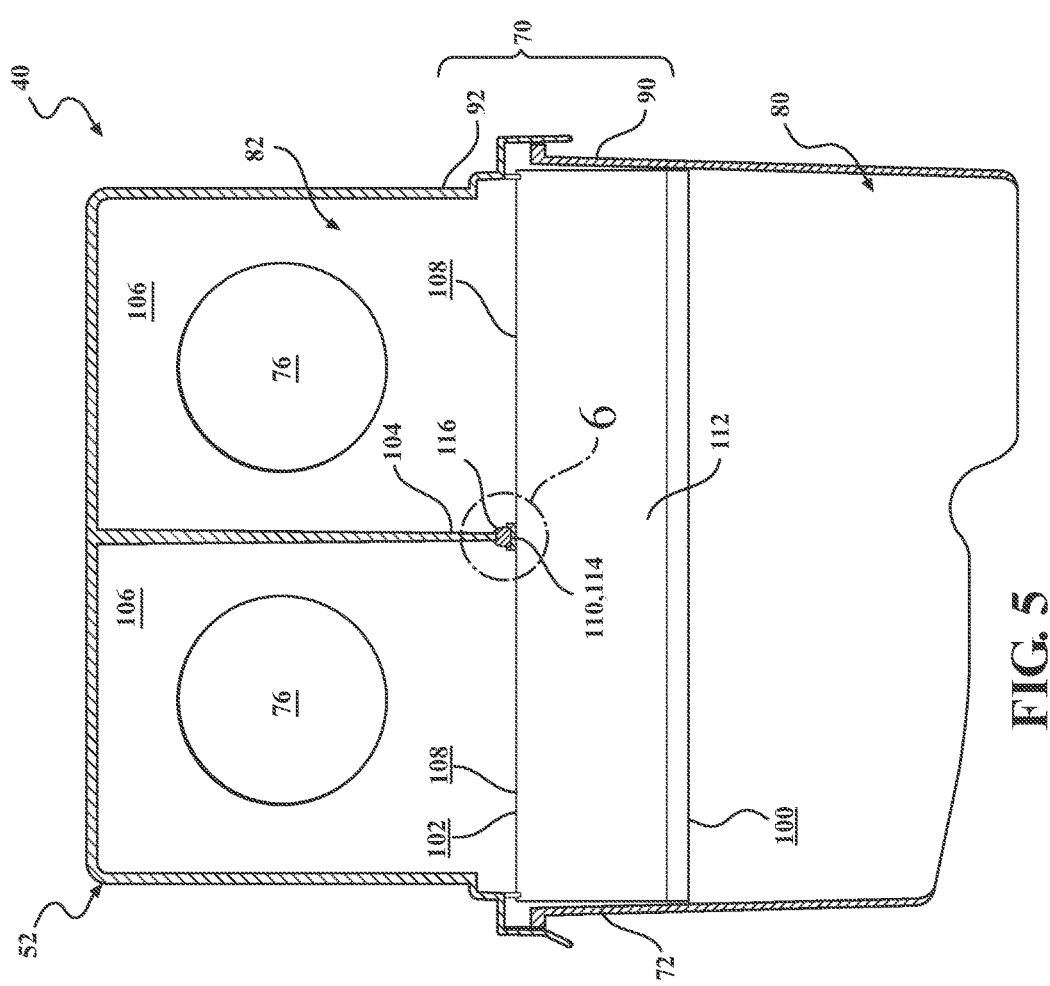

FILTER BOX ASSEMBLY FOR A BRANCHED INTAKE SYSTEM

TECHNICAL FIELD

The embodiments disclosed herein generally relate to filter box assemblies included in intake systems for vehicle engines.

BACKGROUND

Most if not all vehicles with an internal combustion engine have an intake system for the engine. The intake system supports the supply of air from the ambient environment surrounding the vehicle to the engine's intake valves. The intake system typically includes a filter box assembly that is configured to intake dirty air containing particles, remove the dirty air's particles, and output the resulting clean air for supply to the engine's intake valves.

SUMMARY

Disclosed herein are embodiments of vehicles with branched intake systems for their engines, and filter box assemblies for these branched intake systems. In one aspect, a filter box assembly for a branched intake system in a vehicle includes an air filter and a filter box housing the air filter. The air filter has a downstream face. The filter box defines an airflow path between a dirty air intake opening and multiple clean air output openings, has a clean air section at the downstream face of the air filter from which each of the clean air output openings open, and includes an interior wall in the clean air section that branches the airflow path to each of the clean air output openings at the downstream face of the air filter.

In another aspect, a vehicle includes an engine and an intake system for the engine. The intake system includes an air filter, a filter box housing the air filter and multiple branches. The air filter has a downstream face. The filter box defines an airflow path between a dirty air intake opening and multiple clean air output openings, has a clean air section at the downstream face of the air filter from which each of the clean air output openings open, and includes an interior wall in the clean air section that branches the airflow path to each of the clean air output openings at the downstream face of the air filter. A branch is connected to the filter box over each of the clean air output openings.

In yet another aspect, a twin-turbo charged vehicle includes an engine, two turbochargers and an intake system for the engine. The two turbochargers each include a compressor. The intake system includes an air filter, a filter box housing the air filter and two branches. The air filter has a downstream face. The filter box defines an airflow path between a dirty air intake opening and two clean air output openings, has a clean air section at the downstream face of the air filter from which each of the two clean air output openings open, and includes an interior wall in the clean air section that branches the airflow path to each of the two clean air output openings at the downstream face of the air filter. The two branches respectively connect to the filter box over each of the two clean air output openings. Each of the two branches has a respective of the two compressors, and its own air sensor.

These and other aspects will be described in additional detail below.

BRIEF DESCRIPTION OF THE DRAWINGS

The various features, advantages and other uses of the present embodiments will become more apparent by referring to the following detailed description and drawing in which:

FIG. 5 is cross sectional view of the filter box assembly taken along the line 5-5 in FIG. 2, showing the features of a seal between the interior wall and the downstream face of the air filter; and FIG. 6 is an enlarged partial cross sectional view of a portion of the filter box assembly identified as 6 in FIG. 5.

DETAILED DESCRIPTION

This disclosure teaches a filter box assembly for a branched intake system. The intake system includes the filter box assembly, and multiple branches from the filter box assembly. The filter box assembly includes a filter box and an air filter housed in the filter box. The filter box defines an interior branched airflow path between an exterior dirty air intake opening and multiple exterior clean air output openings. The filter box includes an interior wall that branches the airflow path at a downstream face of the air filter.

Figure 1:
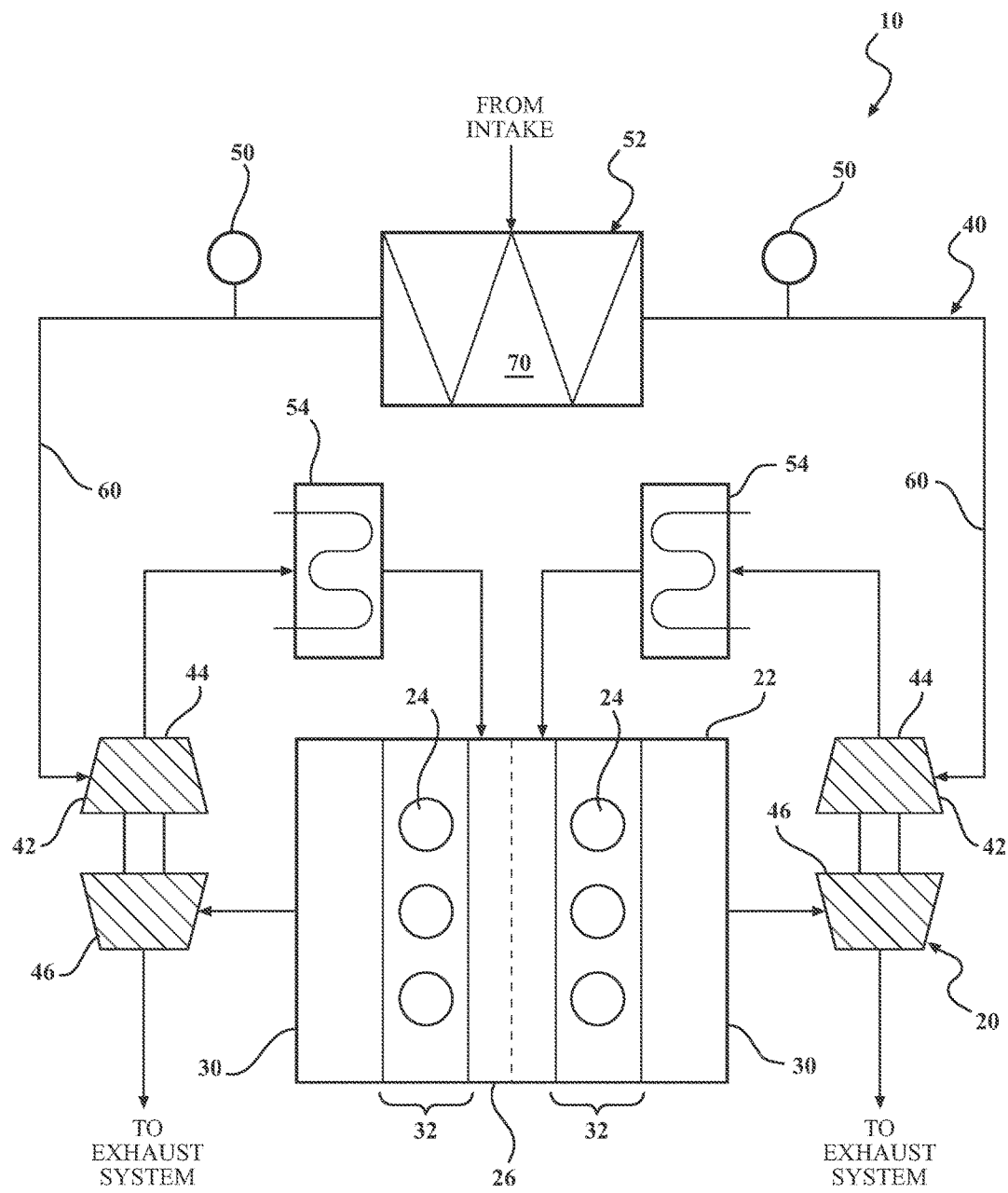
FIG. 1 is a schematic representation of a part of a vehicle, showing an engine system with an internal combustion engine, and a branched intake system for the engine that includes a filter box assembly and multiple branches from the filter box assembly.

A part of a representative vehicle 10 is shown schematically in FIG. 1. The vehicle 10 includes an engine system 20 with an internal combustion engine 22. The vehicle 10 may have an exterior and a number of inner compartments, including a passenger compartment and an engine compartment. In addition to the engine 22, the vehicle 10 may include a motor/generator, a transmission, a battery and other powertrain components housed in its engine compartment or elsewhere in the vehicle 10.

The engine 22 is configured to support the combustion of a fuel-air mixture. The engine 22 defines a number of cylinders 24 where this combustion takes place. The engine 22 has one or more intake valves associated with each of the cylinders 24. The air for the fuel-air mixture is received into the cylinders 24 through their respective intake valves. The engine 22 also has an intake manifold 26 connected to the remainder of the engine 22 over its intake valves through which this air is supplied.

The engine 22 has one or more exhaust valves associated with each of the cylinders 24 through which byproducts of the combustion of the fuel-air mixture are expelled from the cylinders 24. The engine 22 also has an exhaust manifold 30 connected to the remainder of the engine 22 over its exhaust valves through which these byproducts are supplied to an exhaust system for the vehicle 10. The exhaust system may include one or more catalytic converters, resonators and mufflers, and intermediary exhaust pipes between these components. The exhaust system may further include one or more tailpipes that extend from a penultimate downstream component, typically a muffler, and culminate the exhaust system at the ambient environment surrounding the vehicle 10.

The cylinders 24 of the engine 22 may be arranged in one or more cylinder banks 32, with each cylinder bank 32 including one, some or all of the cylinders 24. The cylinders 24 included in a given cylinder bank 32 may be or include any group of neighboring or non-neighboring cylinders 24. If the engine 22 has a "V" configuration, with cylinders 24 defined on both transverse sides of the engine 22 (e.g., if the engine 22 is a V-4, V-6, V-8, etc. engine), the engine 22 may have two cylinder banks 32, with each cylinder bank 32 including the cylinders 24 arranged on one transverse side of the engine 22.

In configurations of the engine 22 where its cylinders 24 are arranged in multiple cylinder banks 32, its intake manifold 26 may have multiple corresponding portions, with each portion of the intake manifold 26 being dedicated to supplying air to the intake valves associated with the cylinders 24 included in a respective cylinder bank 32. The intake manifold 26 may, for example, define multiple interior airflow paths, with each airflow path being dedicated to supplying air to the intake valves associated with the cylinders 24 included in a respective cylinder bank 32.

In addition to the engine system 20, with the engine 22 and its cylinders 24, intake manifold 26, intake valves, exhaust valves and exhaust manifold 30, the vehicle 10 includes an intake system 40 for the engine 22. The intake system 40 supports the supply of air for the fuel-air mixture from the ambient environment surrounding the vehicle 10 to the intake valves. More specifically, the intake system 40 includes an intake and, together with the engine 22 and, optionally, other parts of the engine system 20, defines at least one airflow path from the intake to the intake valves.

In addition to the engine 22, the engine system 20 may include other components supporting either the operation of the engine 22 or the operation of the intake system 40, or both. The engine system 20 may include one or more compressors 42, for example. The compressors 42 are each located along part of the intake system 40 or otherwise along an airflow path to the intake valves. In operation, the compressors 42 compress the air that is ultimately supplied to the intake valves.

The engine system 20 may include one or more turbochargers 44, with each turbocharger 44 including a respective compressor 42 and an exhaust turbine 46. In this configuration, in operation of the engine system 20, the compressors 42 are powered by the exhaust turbines 46 which, in turn, are driven by byproducts of the combustion of the fuel-air mixture in the cylinders 24. These byproducts may be supplied to the exhaust turbines 46 via the exhaust manifold 30 or the exhaust system. Additionally, or alternatively, one or more of the compressors 42 could be respectively included in a supercharger for the engine system 20. In this configuration, in operation of the engine system 20, the compressors 42 would be mechanically driven by the engine 22.

The engine system 20 may also include one or more air sensors 50. The air sensors 50 are each located along part of the intake system 40 or otherwise along an airflow path to the intake valves. The air sensors 50 may generate signals responsive to local airflow. The signals generated by the air sensors 50 may indicate one or more dynamic properties of the air. The dynamic properties of the air may include its mass flow rate, volumetric flow rate, velocity or pressure, for example. The signals generated by the air sensors 50 may directly indicate one or more dynamic properties of the air, and indirectly indicate one or more other dynamic properties of the air based on known relationships about air and airflow. In one implementation, the air sensors 50 may be mass airflow sensors configured to generate signals responsive to local airflow that directly indicate the mass flow rate of the air.

In addition to the intake, the intake system 40 includes a filter box assembly 52 and one or more heat exchangers 54, as well as intermediary ductwork between these components. The intake system 40 opens, at its intake, to the ambient environment surrounding the vehicle 10, and culminates at the intake manifold 26.

The intake may be located anywhere that the vehicle 10 is exposed to the ambient environment surrounding the vehicle 10, such as at its exterior or in its engine compartment. In operation of the engine system 20, airflow is induced into the intake, and through the filter box assembly 52 and the heat exchangers 54. Dirty air from the ambient environment surrounding the vehicle 10 flows in the intake. The dirty air may contain particles, and the filter box assembly 52 is configured to intake the dirty air, remove the dirty air's particles, and output the resulting clean air for supply to the intake valves via the intake manifold 26. The heat exchangers 54 cool the air that is ultimately supplied to the intake valves.

The intake system 40 may include a single filter box assembly 52, and have multiple branches 60 from the filter box assembly 52 through which the at least one airflow path from the intake to the intake valves is defined.

In some configurations of the vehicle 10, if the engine 22 is in a configuration where its cylinders 24 are arranged in multiple cylinder banks 32, with its intake manifold 26 having multiple corresponding portions each dedicated to supplying air to the intake valves associated with the cylinders 24 included in a respective cylinder bank 32, each branch 60 of the intake system 40 may culminate at its own portion of the intake manifold 26. In some configurations, if the engine system 20 includes multiple compressors 42 located along the intake system 40, each branch 60 of the intake system 40 may have its own compressor 42. In some configurations, if the engine system 20 includes multiple air sensors 50 located along the intake system 40, each branch 60 of the intake system 40 may have its own air sensor 50. In some configurations, if the intake system 40 includes multiple heat exchangers 54, each branch 60 of the intake system 40 may have its own heat exchanger 54.

According to these configurations, each branch 60 of the intake system 40 may have any combination of culminating at its own portion of the intake manifold 26, having its own compressor 42, having its own air sensor 50 and having its own heat exchanger 54. In one implementation, each branch 60 of the intake system 40 may have its own compressor 42 and its own air sensor 50, for example. In another implementation, each branch 60 of the intake system 40 may culminate at its own portion of the intake manifold 26 and have its own air sensor 50, for example. In another implementation, each branch 60 of the intake system 40 may culminate at its own portion of the intake manifold 26, and have its own compressor 42 and its own air sensor 50, for example.

In a "twin-turbo" configuration of the vehicle 10 represented in FIG. 1, the engine system 20 includes two turbochargers 44 and, by extension, two compressors 42, which are each located along the intake system 40. Moreover, the engine 22 is in a configuration where its cylinders 24 are arranged in two cylinder banks 32, with its intake manifold 26 having two corresponding portions each dedicated to supplying air to the intake valves associated with the cylinders 24 included in a respective cylinder bank 32.

The represented implementation of the intake system 40 includes the single filter box assembly 52, and two branches 60 from the filter box assembly 52, through which respective airflow paths are defined, that each culminate at their own portion of the intake manifold 26. Each branch 60 of the intake system 40 has its own compressor 42 for compressing the air that is ultimately supplied to the intake valves to which its own portion of the intake manifold 26 is dedicated to supplying air, as well as its own air sensor 50 that generates signals responsive to local airflow, and its own heat exchanger 54.

Figure 2:
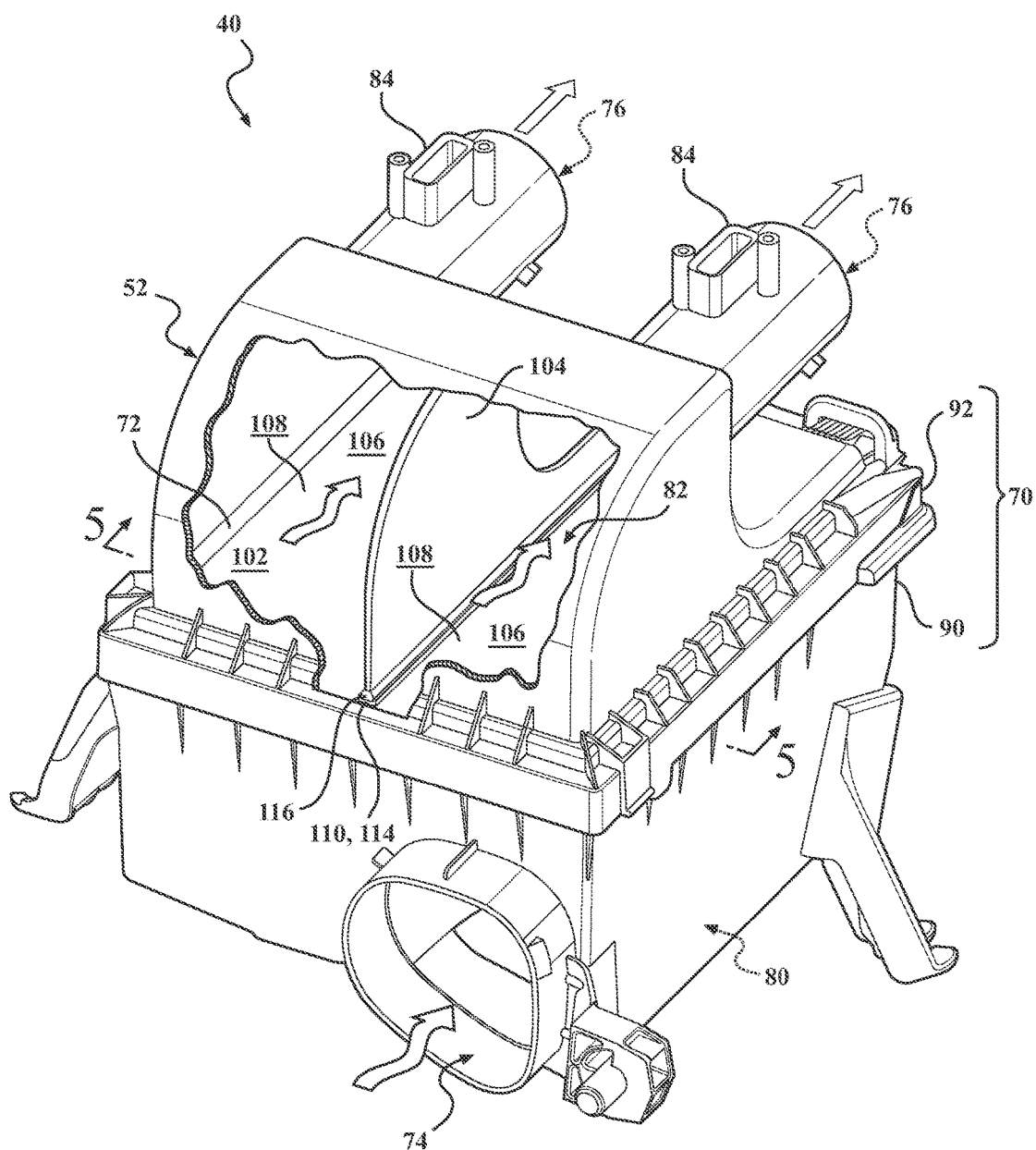
FIG. 2 is a partially cut away perspective view of an example filter box assembly employable in the branched intake system, showing an air filter and a filter box that defines an airflow path between a dirty air intake opening and multiple clean air output openings, and includes an interior wall that branches the airflow path at a downstream face of the air filter.
Figure 3:
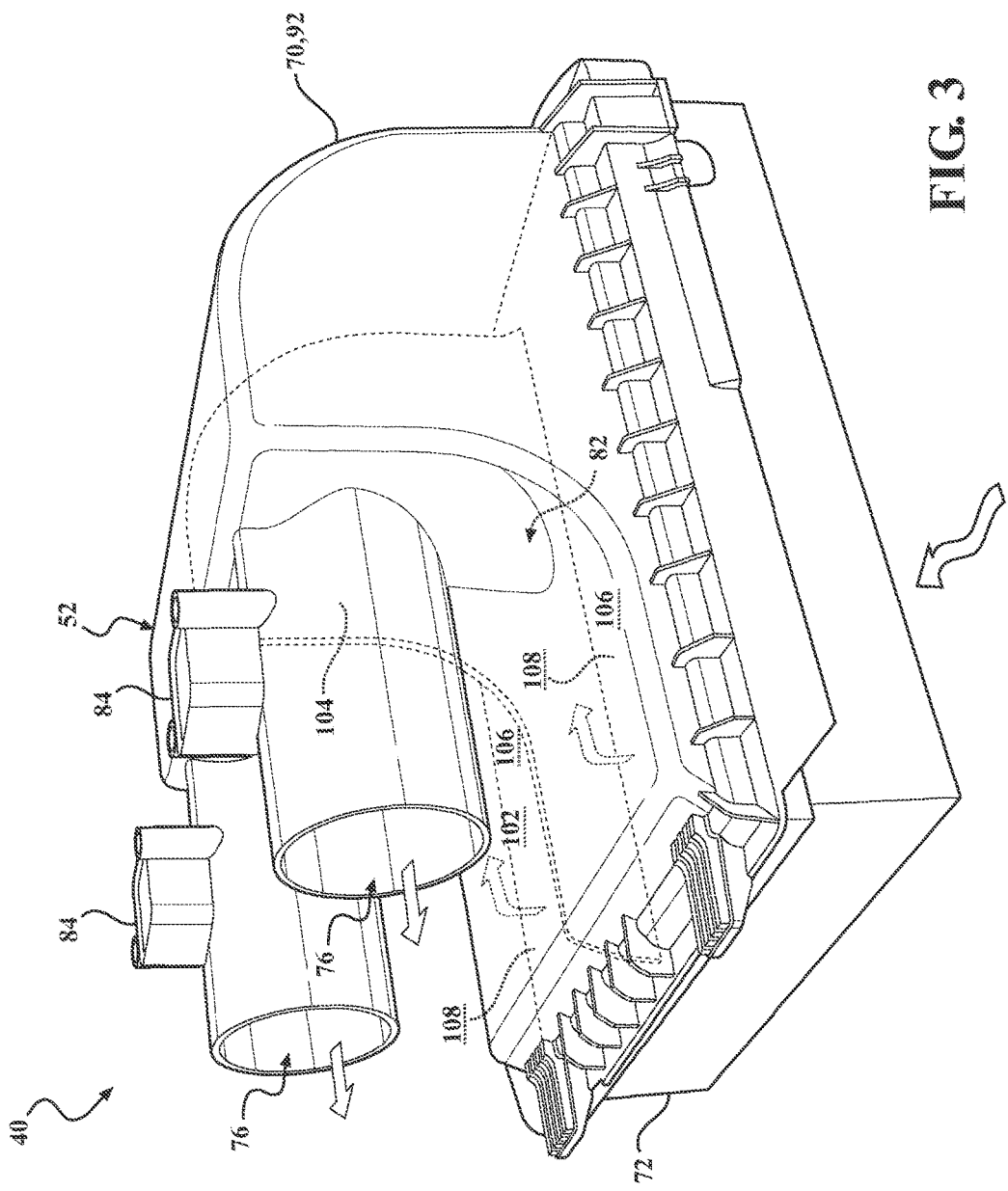
FIG. 3 is an alternative perspective view of the filter box assembly.
Figure 4:
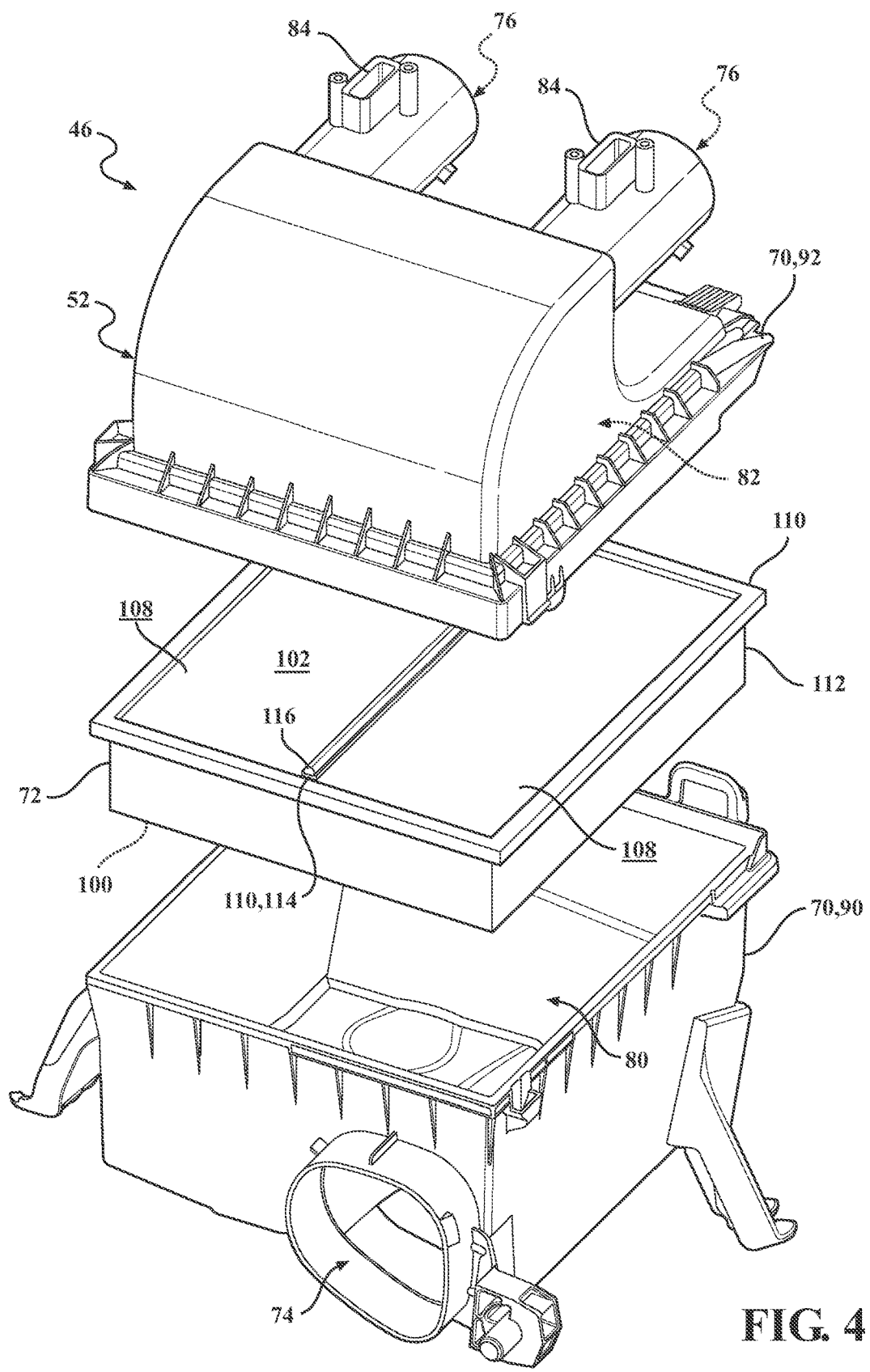
FIG. 4 is an assembly view of the filter box assembly.

As shown with additional reference to FIGS. 2-4, an example filter box assembly 52 employable in these and other implementations of the intake system 40 includes a filter box 70 and an air filter 72 housed in the filter box 70. The filter box 70 defines an interior branched airflow path between an exterior dirty air intake opening 74 and multiple exterior clean air output openings 76. The filter box 70, along its branched airflow path, has an upstream dirty air section 80 and a downstream clean air section 82 separated by the air filter 72.

The dirty air intake opening 74 and the clean air output openings 76 each open from the remainder of the filter box 70. In the intake system 40, upstream ductwork may be connected over the intake and to the filter box 70 over its dirty air intake opening 74. The multiple branches 60 from the filter box assembly 52 may be implemented in whole or in part by downstream ductwork connected to the filter box 70 over its clean air output openings 76. In implementations where each branch 60 of the intake system 40 has its own air sensor 50, the filter box 70 may include multiple mounting structures 84 for air sensors 50 bordering respective of the clean air output openings 76. Otherwise, the same or similar mounting structures 84 could be included on the downstream ductwork.

In operation of the engine system 20, airflow is induced through the filter box assembly 52 along the branched airflow path. More specifically, airflow is induced into the dirty air intake opening 74, from the dirty air section 80 to the clean air section 82 through the air filter 72, and out the clean air output openings 76. With this, dirty air from the ambient environment surrounding the vehicle 10 flows in the dirty air intake opening 74. The dirty air may contain particles of any kind of solid or liquid matter. The particles may be debris, for example. The dirty air took in at the dirty air intake opening 74 flows along the branched airflow path through the air filter 72. The air filter 72 may be a particle filter for removing the particles contained in the dirty air. The resulting clean air then flows out the clean air output openings 76.

The filter box 70 generally forms a generally enclosed housing for the air filter 72. The filter box 70 further forms the exterior of the filter box assembly 52 and contains its branched airflow path. The filter box 70 may be constructed from a combination of interconnected or selectively connectable pieces. As shown, the filter box 70 is constructed from a case 90 and a complementary cap 92 that selectively connects to the case 90. The air filter 72 may be accessed for servicing or replacement by disconnecting the cap 92 from the case 90. The case 90, the cap 92 and any other pieces of the filter box 70 may be made from plastic or any other suitable material or combination of materials.

The case 90 forms a base and a lower portion of the perimeter of the filter box 70, while the cap 92 forms a roof and an upper portion of the perimeter of the filter box 70. The air filter 72 is a generally flat panel air filter 72 that has an upstream face 100 and an opposing downstream face 102. The air filter 72 is supported in the filter box 70 across its perimeter at the junction between the case 90 and the cap 92. Accordingly, the case 90 forms an exterior portion of the filter box 70 that, with the upstream face 100 of the air filter 72, encloses the dirty air section 80, and the cap 92 forms an exterior portion of the filter box 70 that, with the downstream face 102 of the air filter 72, encloses the clean air section 82. The dirty air intake opening 74 opens from the exterior of the case 90 to the dirty air section 80. Similarly, the clean air output openings 76 open from the exterior of the cap 92 to the clean air section 82.

As shown with additional reference to FIGS. 5 and 6, the filter box 70 includes one or more upright interior walls 104 that branch the airflow path at the downstream face 102 of the air filter 72 to the clean air output openings 76. More specifically, the upright interior walls 104 divide the space between the exterior portion of the filter box 70 and the downstream face 102 of the air filter 72, which together enclose the clean air section 82, into multiple interior chambers 106, to which the clean air output openings 76 respectively open. With this configuration, each branch of the airflow path is defined through a respective interior chamber 106 which, in turn, is defined in part by a respective section 108 of the downstream face 102 of the air filter 72. Accordingly, the air filter 72, although unitary, is divided at its downstream face 102 into multiple sections 108 through which respective branches of the airflow path are defined.

In the illustrated configuration where the filter box 70 defines its branched airflow path between the exterior dirty air intake opening 74 and two exterior clean air output openings 76, the filter box 70 may include one upright interior wall 104. To branch the airflow path at the downstream face 102 of the air filter 72, the interior wall 104 divides the space between the exterior portion of the filter box 70 and the downstream face 102 of the air filter 72 into two interior chambers 106 to which the clean air output openings 76 respectively open. Each branch of the airflow path is defined through a respective interior chamber 106 which, in turn, is defined in part by a respective section 108 of the downstream face 102 of the air filter 72. Accordingly, the air filter 72, although unitary, is divided at its downstream face 102 into two sections 108 through which respective branches of the airflow path are defined.

Either the downstream face 102 of the air filter 72, or the upright interior walls 104 that branch the airflow path at the downstream face 102 of the air filter 72, or both, may have features for making an airtight seal between the interior walls 104 and the downstream face 102 of the air filter 72. The air filter 72 may have a rigid frame 110 that supports a filter media 112, such as pleated paper. The frame 110 may include a perimeter to which a sealing compound is applied to effect a seal at the junction between the case 90 and the cap 92. The frame 110 may further have an interior channel 114 to which an additional sealing compound 116 is applied to effect a seal at the junction between the interior walls 104 and the downstream face 102 of the air filter 72. The sealing compound 116 may be a resilient material, such as urethane.

By branching the airflow path at the downstream face 102 of the air filter 72, unpredictable variations in the dynamic properties of the air in each branch of the airflow path are reduced or eliminated. These variation might otherwise be caused by turbulence in the clean air section 82, or the pulsation of the engine 22 downstream of the multiple branches 60 from the filter box assembly 52 in the intake system 40, for example. Advantageously, reducing or eliminating these variations increases the accuracy of the air sensors 50 in implementations where each branch 60 of the intake system 40 has its own air sensor 50. Reducing or eliminating these variations is moreover advantageous in other implementations, for example, where each branch 60 of the intake system 40 culminates at its own portion of the intake manifold 26 or has its own compressor 42. Moreover, as opposed to the case where an intake system 40 with multiple branches 60 includes multiple filter box assemblies 52 for the multiple branches 60, in which each filter box assembly 52 would include a downsized air filter, the same air filter 72 may be used in an otherwise similar vehicle 10 that includes an intake system 40 with one branch 60 and one filter box assembly 52 for the branch 60. This advantageously increases commonality of parts used across similar vehicles 10.

While recited characteristics and conditions of the invention have been described in connection with certain embodiments, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A filter box assembly for a branched intake system in a vehicle, comprising:
    an air filter with a downstream face; and
    a filter box housing the air filter, the filter box defining an airflow path between a dirty air intake opening and multiple clean air output openings, having a clean air section at the downstream face of the air filter from which each of the clean air output openings open, and including an interior wall in the clean air section that shares a junction with the downstream face of the air filter and branches the airflow path to each of the clean air output openings at the downstream face of the air filter along the junction.

2. The filter box assembly of claim 1, wherein the interior wall divides the air filter at its downstream face along the junction into multiple sections through which respective branches of the airflow path are uniquely defined.

3. The filter box assembly of claim 1, wherein the filter box includes multiple mounting structures for air sensors bordering respective of the clean air output openings.

4. The filter box assembly of claim 1, wherein the filter box has a dirty air section at an upstream face of the air filter opposing the downstream face from which the dirty air intake opening opens.

5. A vehicle, comprising:
    an engine; and
    an intake system for the engine, the intake system including:
        an air filter with a downstream face;
        a filter box housing the air filter, the filter box defining an airflow path between a dirty air intake opening and multiple clean air output openings, having a clean air section at the downstream face of the air filter from which each of the clean air output openings open, and including an interior wall in the clean air section that shares a junction with the downstream face of the air filter and branches the airflow path to each of the clean air output openings at the downstream face of the air filter along the junction; and
        multiple branches respectively connected to the filter box over each of the clean air output openings.

6. The vehicle of claim 5, wherein the interior wall divides the air filter at its downstream face along the junction into multiple sections through which respective branches of the airflow path are uniquely defined.

7. The vehicle of claim 5, wherein the filter box includes multiple mounting structures for air sensors bordering respective of the clean air output openings.

8. The vehicle of claim 5, wherein the filter box has a dirty air section at an upstream face of the air filter opposing the downstream face from which the dirty air intake opening opens.

9. The vehicle of claim 5, wherein each branch of the intake system has its own air sensor.

10. The vehicle of claim 5, wherein each branch of the intake system has its own compressor.

11. The vehicle of claim 5, wherein each branch of the intake system has its own air sensor and its own compressor.

12. The vehicle of claim 5, wherein:
    the engine has an intake manifold, cylinders arranged in multiple cylinder banks and one or more intake valves associated with each of the cylinders, with the intake manifold having multiple portions each dedicated to supplying air to the intake valves associated with the cylinders included in a respective cylinder bank; and
    each branch of the intake system culminates at its own portion of the intake manifold of the engine.

13. The vehicle of claim 12, wherein each branch of the intake system has its own air sensor.

14. The vehicle of claim 12, wherein each branch of the intake system has its own compressor.

15. A twin-turbo charged vehicle, comprising:
    an engine;
    two turbochargers each including a respective of two compressors; and
    an intake system for the engine, the intake system including:
        an air filter with a downstream face;
        a filter box housing the air filter, the filter box defining an airflow path between a dirty air intake opening and two clean air output openings, having a clean air section at the downstream face of the air filter from which each of the two clean air output openings open, and including an interior wall in the clean air section that shares a junction with the downstream face of the air filter and branches the airflow path to each of the two clean air output openings at the downstream face of the air filter along the junction; and
        two branches respectively connected to the filter box over each of the two clean air output openings, each of the two branches having a respective of the two compressors, and its own air sensor.

16. The twin-turbo charged vehicle of claim 15, wherein the interior wall divides the air filter at its downstream face along the junction into two sections through which two respective branches of the airflow path are uniquely defined.

17. The twin-turbo charged vehicle of claim 15, wherein the filter box includes two mounting structures for the air sensors bordering respective of the two clean air output openings.

18. The twin-turbo charged vehicle of claim 15, wherein the filter box has a dirty air section at an upstream face of the air filter opposing the downstream face from which the dirty air intake opening opens.

19. The twin-turbo charged vehicle of claim 15, wherein:
the engine has an intake manifold, cylinders arranged in two cylinder banks and one or more intake valves associated with each of the cylinders, with the intake manifold having two portions each dedicated to supplying air to the intake valves associated with the cylinders included in a respective cylinder bank; and
each of the two branches of the intake system culminates at its own portion of the intake manifold of the engine.

* * * * *